Dec. 13, 1966    R. E. LEE    3,292,035
SEMICONDUCTOR HEADLIGHT CONTROL SYSTEM
Filed Dec. 13, 1963
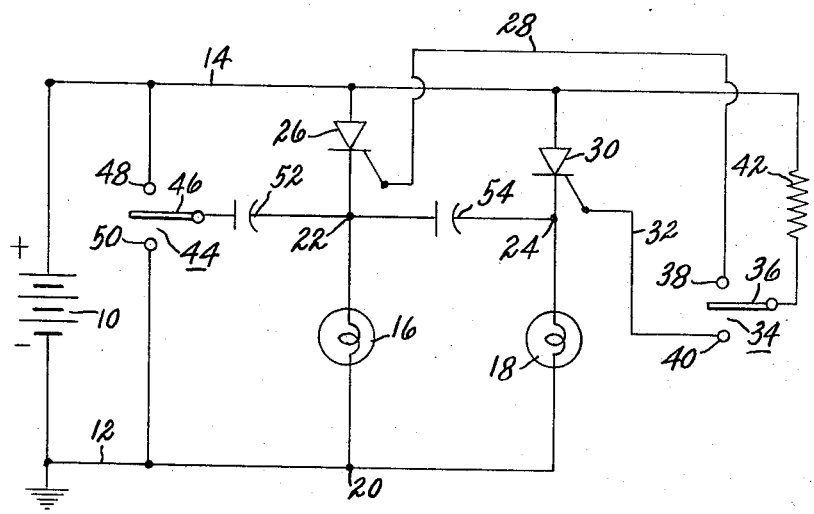
INVENTOR.
ROBERT E. LEE
BY C. R. Meland
HIS ATTORNEY

United States Patent Office 3,292,035
Patented Dec. 13, 1966

3,292,035
SEMICONDUCTOR HEADLIGHT CONTROL
SYSTEM
Robert E. Lee, Davison, Mich., assignor to General
Motors Corporation, Detroit, Mich., a corporation of
Delaware
Filed Dec. 13, 1963, Ser. No. 330,295
3 Claims. (Cl. 315—83)

This invention relates to headlight control systems for a motor vehicle and more particularly to a headlight control system which uses a semiconductor as the switching element for controlling the high beam and low beam circuits of the headlight control system.

One of the objects of this invention is to provide a headlight control system wherein a plurality of semiconductors are used to control the high and low beam circuits and wherein the semiconductors have their conduction controlled by a manually operable means.

Another object of this invention is to provide a headlight control system wherein the switching from the low beam circuit to the high beam circuit or vice versa takes place in response to the momentary closure of a switch.

Still another object of this invention is to provide a headlight control system which includes a pair of controlled rectifiers for alternately energizing either a high beam circuit or a low beam circuit under the control of a momentary operable device such as a switch.

A further object of this invention is to provide a headlight control system wherein the switching from a high beam energization to a low beam energization or vice versa can take place in response to a small control current. This small control current may be, for example, the gate current of a controlled rectifier where the controlled rectifiers are used to control the high and low beam circuits.

Further objects and advantages of the present invention will be apparent from the following description, reference being had to the accompanying drawings wherein preferred embodiments of the present invention are clearly shown.

The single figure drawing is a schematic circuit diagram of a headlight control system made in accordance with this invention.

Referring now to the drawing, the reference numeral 10 designates a source of direct current which is illustrated as a battery. The negative side of the battery 10 is connected with conductor 12 which is grounded. The positive side of the battery 10 is connected with conductor 14. The battery 10 may be, for example, the battery on a motor vehicle and on motor vehicles, the battery 10 is charged by a generator which is not shown. The term "source of direct current" is intended to cover either the battery or a generator or any other source of direct current that could be used to energize the conductors 12 and 14.

The reference numeral 16 designates the high beam filaments for a motor vehicle headlamp system. Only one filament 16 is illustrated but it will be appreciated that as many as four filaments can be used with two on each side of the motor vehicle for high beam headlights.

The reference numeral 18 designates the low beam filaments for the head lamps of a motor vehicle and there may be as many as two of these, one on each side of the front end of the motor vehicle, as is common practice.

One side of the high beam filament 16 is connected to the grounded junction 20 as is one side of the low beam filament 18. The high beam circuit is fed from junctions 22 while the low beam head lamp circuit is fed from junction 24.

The junction 22 is connected with the cathode of a silicon controlled rectifier 26. The gate of controlled rectifier 26 is connected with conductor 28. The anode of controlled rectifier 26 is connected with conductor 14.

The junction 24 which feeds the low beam circuit for the head lamp system is connected with the cathode of controlled rectifier 30. The gate of controlled rectifier 30 is connected with conductor 32. The anode of controlled rectifier 30 is connected with conductor 14.

The controlled rectifiers 26 and 30 will conduct in a forward direction whenever an anode is driven positive with respect to its cathode and when the gate is positive with respect to the cathode. Once the controlled rectifier has been driven into a state of conduction, it will remain conductive in its anode-cathode circuit even though the gate voltage is removed and this conduction continues until the anode-cathode circuit is interrupted or until the cathode is driven positive with respect to the anode.

The headlight control system of this invention has a dimmer switch which is generally designated by reference numeral 34. This dimmer switch has a movable contact 36 which can engage either the fixed contact 38 or the fixed contact 40. The dimmer switch can be provided with a spring or other means such that in its normal neutral position, the contact 36 does not engage either contact 38 or 40. The switch can be, therefore, of the momentary engagement type since all that is required is a momentary engagement to actuate the system as will become more readily apparent hereinafter.

The fixed contact 40 of the switch 34 is connected with the gate of controlled rectifier 30 via conductor 32. The fixed contact 38 of the switch 34 is connected with the gate of controlled rectifier 26 via conductor 28. The movable contact 36 of the switch 34 is connected with power conductor 14 through a resistor 42.

The headlight system has a turn-off control switch designated by reference numeral 44. This switch has a movable contact 46 and fixed contacts 48 and 50. The fixed contact 48 is connected with power conductor 14 while the fixed contact 50 is connected with the grounded power conductor 12. The movable contact 46 is connected to one side of a capacitor 52. The opposite side of the capacitor 52 is connected with junction 22. Another capacitor 54 connects the junctions 22 and 24.

It is important in the system of this invention that the switch 34 be of a momentary type since it is possible to energize either the low beam filaments or the high beam filaments by a momentary engagement of the contactor 36 with either contact 38 or 40. The switch 44 as is more fully described hereinafter operates to turn off either controlled rectifier 26 or 30 when the switch contact 46 is shifted from contact 50 into momentary engagement with contact 48. It will be appreciated from a description of the operation of this system, which is to follow, that switch 34 is capable of turning on either the low beam or the high beam circuit and if one of the circuits is at that time energized, it will turn that one off. The control switch 44 on the other hand, is used when it is desired to completely deenergize both the low beam circuit and the high beam circuit. When switch 44 is operated, one or the other of the low beam or high beam circuits will have already been deenergized due to operation of switch 34.

The operation of the system will now be described. Assuming that neither controlled rectifier 26 or 30 is turned on and it is desired to turn on the low beam filament 18, the contact 36 is momentarily moved into engagement with contact 40. When this occurs, the gate of controlled rectifier 30 is positive with respect to its cathode and its anode is also positive with respect to the cathode. The controlled rectifier 30 will now turn on in its anode-cathode circuit and the low beam filament 18 will therefore be energized from conductor 14 through the anode-cathode circuit of controlled rectifier 30 and then through the low beam filaments 18 to the grounded conductor 12. When controlled rectifier 30 turns on, the junction 24 is substantially at positive battery potential and the capacitor 54 will therefore be charged to substantially battery potential and with a polarity that is positive at junction 24 and negative at junction 22. To summarize, it is seen that after contact 36 is moved into momentary engagement with contact 40, the low beam filaments 18 are energized and capacitor 54 has been charged positive at junction 24 and negative at junction 22.

Assuming now that the driver of a motor vehicle desires to energize the high beam filaments 16 and turn off the low beam filaments 18, the contact 36 of switch 34 is momentarily moved into engagement with the fixed contact 38. The controlled rectifier 30 remains turned on and the controlled rectifier 26 now also turns on in its anode-cathode circuit because the gate of controlled rectifier 26 goes positive when contacts 36 engage fixed contact 38. When controlled rectifier 26 turns on in its anode-cathode circuit, the junction 22 will be at substantially positive battery potential but the potential of junction 24 due to the previous charging of capacitor 54 will rise to substantially two times battery potential. The cathode of controlled rectifier 30 is therefore momentarily driven positive with respect to its anode which turns off the controlled rectifier 30 thereby deenergizing the low beam filaments 18. The high beam filaments 16 are now energized through the anode-cathode circuit of controlled rectifier 26.

If the contactor 36 is now momentarily moved into engagement with fixed contact 40, controlled rectifier 30 will be turned back on and controlled rectifier 26 will be turned off. Thus as soon as controlled rectifier 30 is turned on, the potential of junction 24 will raise to substantially the positive potential of the battery and due to the charge on capacitor 54 which now will be positive on junction 22, the potential of junction 22 will be raised to substantially twice that of the battery 10 so that controlled rectifier 26 is biased off by raising the potential of its cathode with respect to its anode.

From the foregoing, it will be apparent that the momentary engagement of contact 36 with either contact 38 or 40 causes the system to turn on one controlled rectifier and turn off the other. The controlled rectifier that was previously on is always turned off whenever the switch 36 is actuated to change from low beam energization to high beam energization or vice versa. The switch 34 is not capable of deenergizing both controlled rectifiers and for this reason, the switch 46 is provided to turn off one or the other of the controlled rectifiers 26 or 30 depending upon which one is on when it is desired to deenergize the high beam and the low beam circuits.

Assume first of all that controlled rectifier 30 has been turned on in a manner described above and it is desired to deenergize both the low beam and the high beam filaments. The high beam filaments at this time will already have been deenergized since controlled rectifier 26 is turned off.

To turn off controlled rectifier 30, contact 46 is shifted from contact 50 into engagement with contact 48. It is to be kept in mind that when controlled rectifier 30 is on, capacitor 54 will be charged positive at junction 24 and negative at junction 22 to substantially battery potential. When contact 46 engages contact 48, a charging circuit is established for capacitor 52 which is from the positive side of battery 10, through contacts 48 and 46, through capacitor 52 and then through the high beam filament 16 back to the negative side of battery 10 through conductor 12. At the instant that the charging circuit is established for capacitor 52, by the closing contacts 46 and 48, the junction 22 will be at substantially the positive potential of battery 10. Because of the charge on capacitor 54, the potential of junction 24 will be raised to substantially twice positive battery potential as capacitor 52 charges and the controlled rectifier 30 will therefore be switched off. Since controlled rectifier 26 was already off and controlled rectifier 30 is now switched off, neither the high beam circuit nor the low beam circuit is energized.

Assume now that controlled rectifier 26 has been turned on to energize the high beam filament 16 and it is desired to deenergize both the high beam and the low beam circuits. This deenergization is accomplished by moving contact 46 into engagement with contact 50 and then into engagement with contact 48. If contact 46 was in engagement with contact 50, it is only necessary to momentarily move it into engagement with contact 48. When contact 46 engages contact 50 and controlled rectifier 26 is turned on, the junction 22 is substantially at positive battery potential and the capacitor 52 will be charged through contacts 46 and 50 to battery potential and to a polarity which is positive at junction 22. When contact 46 is now momentarily moved into engagement with contact 48, the negative side of capacitor 52 is connected with the positive side of the battery 10. This raises the potential of junction 22 momentarily to a value which is substantially twice battery potential which drives the cathode of controlled rectifier 26 positive with respect to its anode and therefore turns off the controlled rectifier 26. Since controlled rectifier 30 was previously off, both the high beam and low beam filaments are now deenergized.

It, of course, will be appreciated that the controlled rectifiers 26 and 30 can only be turned off by actuation of swicth 44 when contact 36 is not in engagement with either contact 38 or contact 40. The position of switch 44 in no way effects the turning on of either controlled rectifier 26 or 30 and this switching is controlled solely by switch 34. It is also seen that the system can be completely deenergized by moving contact 46 from contact 50 to contact 48 or if the contact 46 is in a neutral position, by moving it into engagement with contact 50 and then into engagement with contact 48.

While the embodiments of the present invention as herein disclosed constitute a preferred form, it is to be understood that other forms might be adopted.

What is claimed is as follows:

1. A headlamp control system comprising, a low beam filament, a high beam filament, a source of direct current, a first controlled rectifier having anode, cathode, and gate electrodes, a second controlled rectifier having anode, cathode and gate electrodes, means connecting the anode and cathode electrodes of said first controlled rectifier and said high beam filament across said source of direct current, means connecting the anode and cathode electrodes of said second controlled rectifier and said low beam filament across said source of direct current, a first switch having a movable contact and a pair of fixed contacts, means connecting said fixed contacts of said first switch with the gate electrodes of said controlled rectifiers, a second switch having a movable contact and a pair of fixed contacts, means connecting the fixed contacts of said second switch respectively with opposite sides of said source of direct current, a first capacitor connecting the movable contact of said second switch with one of the cathodes of one of said controlled rectifiers and a second capacitor connecting the cathodes of said first and second controlled rectifiers.

2. A headlamp control system comprising, a low beam filament, a high beam filament, a source of direct current, a first controlled rectifier having anode, cathode and gate electrodes, a second controlled rectifier having anode, cathode and gate electrodes, means connecting said high beam filament and the anode and cathode electrodes of said first controlled rectifier across said source of direct current, means connecting the anode and cathode electrodes of said second controlled rectifier and said low beam filament across said source of direct current, a first capacitor connecting the cathodes of said controlled rectifiers, a second capacitor, means for connecting said second capacitor selectively between the cathode of one of said controlled rectifiers and either side of said source of direct current, and a control means connected with one side of said source of direct current, said control means being capable of selectively connecting one or the other of the gate electrodes of said controlled rectifiers with said one side of said source of direct current.

3. A power supply system comprising, a first electrical load, a second electrical load, a source of direct current, a first controlled rectifier having anode, cathode, and gate electrodes, a second controlled rectifier having anode, cathode and gate electrodes, means connecting said first electrical load and the anode and cathode electrodes of said first controlled rectifier across said source of direct current, means connecting the anode and cathode electrodes of said second controlled rectifier and said second electrical load across said source of direct current, a first capacitor connected between the cathodes of said controlled rectifiers, a second capacitor, means for selectively connecting said second capacitor between the cathode of one of said controlled rectifiers and either side of said source of direct current, and a control means connected with one side of said source of direct current, said control means being capable of selectively connecting one or the other of the gate electrodes of said controlled rectifiers with said one side of said source of direct current.

References Cited by the Examiner
UNITED STATES PATENTS

| | | | |
|---|---|---|---|
| 3,002,127 | 9/1961 | Grontkowski | 315—77 |
| 3,040,270 | 6/1962 | Gutzwiller | 207—88.5 |
| 3,113,241 | 12/1963 | Yonushka | 315—200 |
| 3,143,665 | 8/1964 | Smith | 307—88.5 |
| 3,174,059 | 3/1965 | Waterman | 307—88.5 |

JAMES W. LAWRENCE, *Primary Examiner.*

C. CAMPBELL, *Assistant Examiner.*